June 24, 1941. A. KLEIJN 2,246,734
APPARATUS FOR CHARGING A CURRENT OF AIR WITH A VOLATILE SUBSTANCE
Filed July 18, 1939
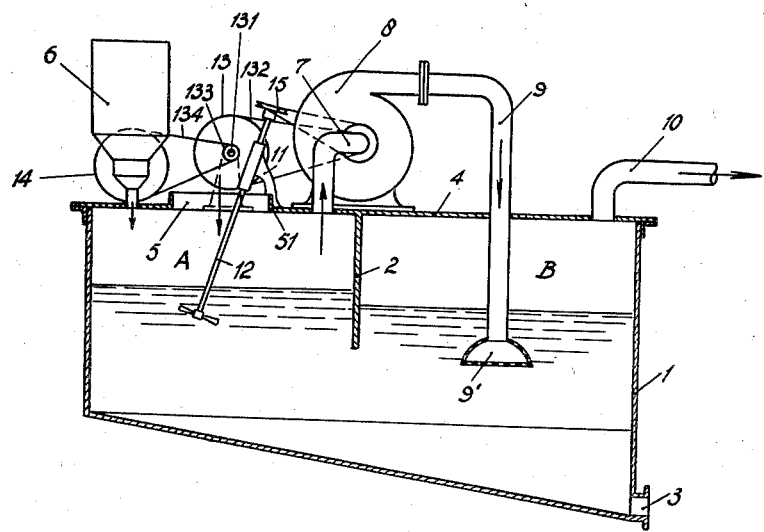
Adrianus Kleijn
by Hammond & Littell Patented June 24, 1941

2,246,734

UNITED STATES PATENT OFFICE 2,246,734

APPARATUS FOR CHARGING A CURRENT OF AIR WITH A VOLATILE SUBSTANCE

Adrianus Kleijn, Rotterdam, Netherlands

Application July 18, 1939, Serial No. 285,085
In Great Britain January 26, 1939

1 Claim. (Cl. 23—282)

The present invention relates to apparatus for use in charging air or other gas with a volatile.

The invention has been developed more particularly in the production of an apparatus for use in generating nitrogen trichloride and charging a current of air with the same for use in treating flour to improve its quality. For the purpose of disclosing the principles of the invention such an embodiment of the invention will be more particularly described. It will be understood however that the particular description is illustrative merely and is not intended as defining the limits of the invention which is capable of application to the treating of a current of gas with various compounds.

It is an object of the invention to provide an apparatus with which halogenated nitrogen can be produced and carried off at a predetermined controlled rate.

Another object of the invention is to provide an apparatus which can be charged at will with chemicals required in the operation without interruption of the operation and without escape of fumes produced in the operation.

Another object is to provide an apparatus wherein means is provided for adding to the reaction mixture one of the ingredients necessary for the reaction at a controlled rate.

Another object is to provide an apparatus having means for feeding certain of the reacting ingredients to a reaction mixture and for operating a blower which carries off the products of the reaction in predetermined timed relation whereby the desired concentration of the generated volatile may be maintained in the current of gas or air delivered.

Another object is to provide an apparatus which can be operated effectively and economically by relatively unskilled persons to deliver a volatile at a predetermined rate.

The nature and objects of the invention will be better understood from a description of an illustrative embodiment of the invention for the purpose of which description reference should be had to the accompanying drawing forming a part hereof and in which the figure is a diagrammatic sectional view of an apparatus embodying the principles of the invention.

The tank 1 for containing a liquid comprising a volatile component or for containing a reaction mixture in which a volatile is formed or by which a gas current is to be treated is shown as divided by a partition 2 depending from the cover 4 to a point well below the level of the liquid, but not extending to the bottom of the tank, to provide two gas chambers A and B above the level of the liquid.

A discharge outlet 3 is provided at the bottom of the tank and an aperture 5 is provided in the cover. An upstanding flange 51 around the aperture inhibits undesired air currents.

A charging device 6 is provided to facilitate the gradual addition of measured charges of granular material. By this charging device successive charges of granular or pulverized oxidising agent or other reaction component can be added at predetermined intervals or a constant charging can be maintained. The operation of this charging device is such that the material may be added at a slow rate substantially corresponding to the rate of reaction in the reaction tank. The charging device shown in Patent No. 1,925,650 is particularly suitable.

An air conduit 7 leads from the chamber A above the reaction liquid to the suction side of a blower 8 which forces a constant current of air through the conduit 9 to a distributing head 9' well below the liquid level of the chamber B. The current of air in through the opening 5 and from the chamber A effectively prevents escape of vapour or gas collecting above the liquid in chamber A and the flow of air through the reaction mixture prevents excessive concentration of any volatile product of the reaction within the solution. A discharge conduit 10 carries the air charged or treated in the tank to the point of use. During operation the air pressure in chamber B may cause a difference of level of the reaction mixture.

A bracket 11 on the cover carries a stirring device 12. The charge feeding device 6 and the stirrer 12 are connected to be driven when the blower 8 is operated. The blower may be driven by an electric motor, not shown, and pulleys 14 and 15 of the charging device and the stirrer may be connected to be driven from the blower as by belt gearing conventionally indicated at 13, 131, 132, 133, 134. By this arrangement the feed of material in the device 6 always stops when the air current is discontinued.

In operation the tank is charged with a liquid comprising a volatile or with a reaction mixture adapted to produce a volatile. One component of the reaction mixture is maintained at the desired concentration by addition at suitably timed intervals or constantly at a suitably adjusted rate by means of the charging device 6. Other components are added through the charging opening 5. Preferably the component added by means of the charging device 6 is so selected that it can be added in granular form because of the convenience of handling and the satisfactory results that can be obtained when the process is operated by the relatively unskilled operatives available.

The stirring device 12 is not strictly required but facilitates the rapid distribution of the solid substance in the liquid and therefore the uniform evolution of the volatile substance.

The particular description illustrates one embodiment of the invention, but it will be understood that variations may readily be introduced without departing from the scope of the invention. Furthermore, it will be understood that the apparatus shown and described is capable of use where the air or gas passed through the apparatus is reacted chemically in a reacting agent in the treating tank.

Reference may be had to copending application, Serial No. 285,086 filed concurrently herewith for further disclosure.

What is claimed is:

Apparatus for charging a current of gas with a volatile substance which comprises a tank for containing a reaction mixture, said tank having a partition extending below the surface of the mixture to divide the upper portion into a charging chamber and a gas chamber but terminating above the bottom of the tank to permit free communication within the mixture between opposite sides of said partition, the charging chamber having a charging device for charging material into the reaction mixture and having an opening to provide free access and to admit air during operation, the gas chamber being closed, a gas delivery conduit leading from said closed chamber, a blower, a conduit leading from the charging chamber to the suction side of said blower, a conduit leading from the delivery side of said blower into said closed gas chamber below the surface of the reaction mixture therein whereby gas is delivered into the reaction mixture to be charged with the volatile material and is delivered when so charged through said delivery conduit.

ADRIANUS KLEIJN.